United States Patent [19]
Widner et al.

[11] 3,807,239
[45] Apr. 30, 1974

[54] RADIAL FLUIDIC CAGING GROOVE FOR HIGH G GYRO

[75] Inventors: Rayburn K. Widner, Arab; Aubrey Rodgers, Huntsville, both of Ala.

[73] Assignee: The United States of America as represented by the Secretary of the Army, Washington, D.C.

[22] Filed: Apr. 27, 1972

[21] Appl. No.: 248,143

[52] U.S. Cl. .................................... 74/5.12, 74/5.7
[51] Int. Cl. .............................................. G01c 19/26
[58] Field of Search ............ 74/5.1, 5.12, 5.14, 5.7, 74/5.43; 308/DIG. 1, 9

[56] References Cited
UNITED STATES PATENTS

| | | | |
|---|---|---|---|
| 3,451,289 | 6/1969 | Edmonds et al. | 74/5.12 |
| 3,457,793 | 7/1969 | Evans | 74/5.1 |
| 3,528,300 | 9/1970 | Paine | 74/5.1 X |
| 3,115,784 | 12/1963 | Parker | 74/5.12 |

*Primary Examiner*—Manuel A. Antonakas
*Attorney, Agent, or Firm*—Edward J. Kelly, ; James T. Deaton; Herbert Berl

[57] ABSTRACT

A gyro in which the rotor thereof has a radial fluidic caging groove that has high pressure fluid directed thereto to maintain a caged condition of the gyro rotor during spin up.

7 Claims, 2 Drawing Figures

RADIAL FLUIDIC CAGING GROOVE FOR HIGH G GYRO

BACKGROUND OF THE INVENTION

In the missile industry as well as in other related industries, there is a constant need for gyro devices that are simple, accurate, reliable and relatively cheap to build. It is especially desirable in these type devices that they be provided with uncaging mechanism for the rotor that will reduce or prevent "uncaging kick" of the rotor. Further, it would be especially desirable to have uncaging mechanism that has a fluid control and is so constructed that it has accurate repeatability.

Therefore, it is an object of this invention to provide a gyro rotor with pneumatic caging means.

Another object of this invention is to provide a gyro that is relatively simple in construction.

A further object of this invention is to provide a gyro that is air bearing supported, brought up to speed by pneumatic means and maintained in a caged position until full spin up by pneumatic means.

SUMMARY OF THE INVENTION

In accordance with this invention, a gyro is provided that has a rotor that is air supported by air bearing means, anouter periphery with spin up buckets therein for receiving fluid from a plurality of ports to bring the rotor up to speed, and a caging V-groove that is mounted in the rotor adjacent the spin up buckets and circumferential of said rotor. The circumferential V-groove receives fluid from ports that are supplied with fluid from the same source as that for the spin up buckets. By injecting the fluid into the V-groove of the rotor at the same time the spin up buckets are receiving fluid to bring the rotor up to speed, the rotor is maintained in a caged position until the rotor is brought up to speed. Once the rotor has been brought up to speed in the caged position, the fluid for the buckets and the V-groove is cut off and the rotor is now ready for performing the desired gyro function.

DESCRIPTION OF THE PREFERRED EMBODIMENT

Figure 1:
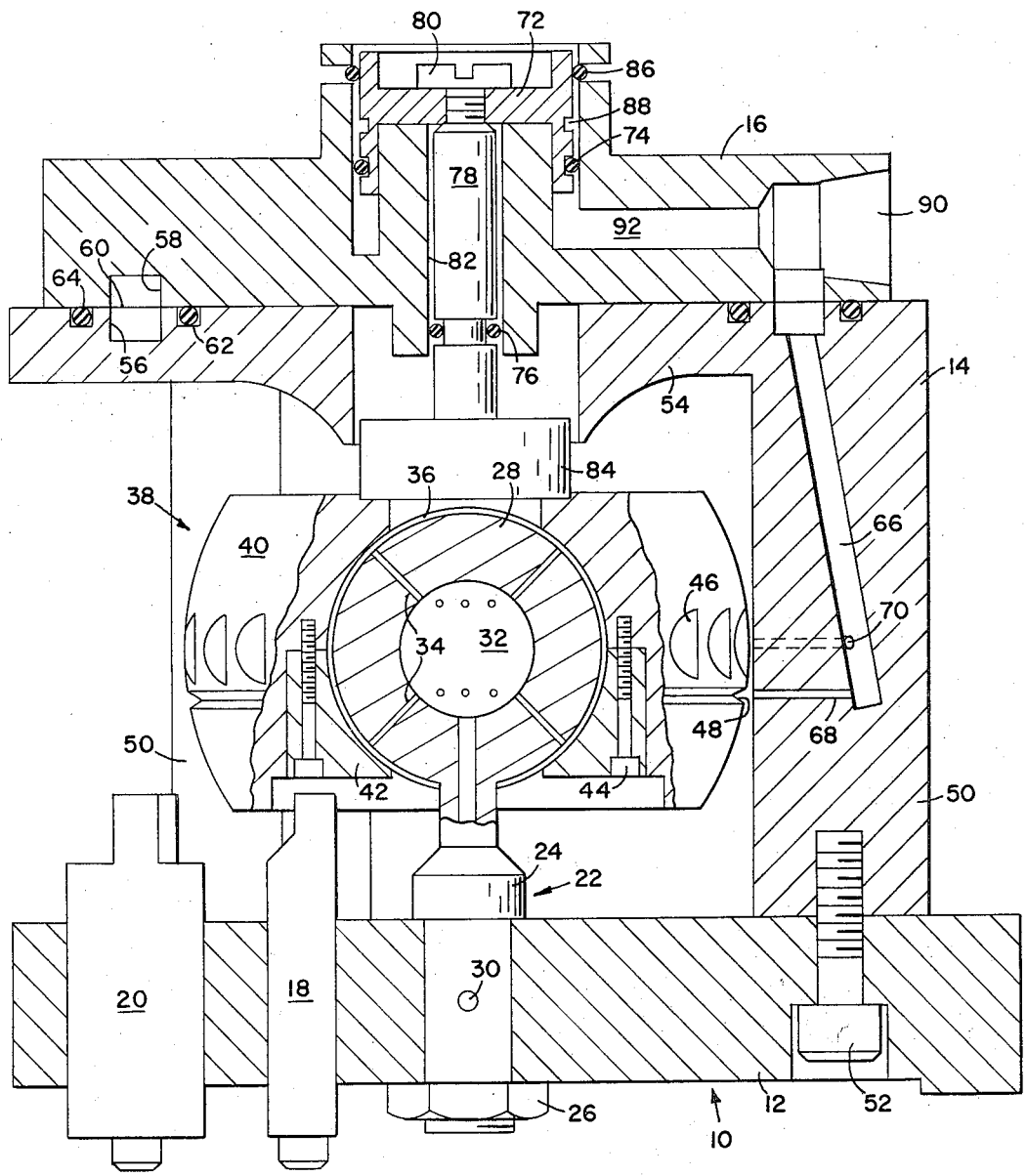
FIG. 1 is a sectional view of one embodiment of a gyro according to this invention.

Referring now to FIG. 1, gyro 10 includes a base 12, an intermediate section 14 and an upper section 16. Base section 12 has pickoffs 18, 20 (only one pair of which is shown) that are mounted on base 12 in a conventional manner. Air bearing support 22 is mounted on base 12 by flange 24 and bolt securing means 26. Air bearing support 22 has a ball shaped member 28 that is supplied fluid from inlet 30 to chamber 32 of the ball and then through ports 34 to air bearing space 36 that is defined between ball member 28 and rotor 38. Rotor 38 has two sections 40 and 42 that are secured together by conventional securing means such as screws 44. Rotor member 40 has spin up buckets 46 in the outer periphery thereof and V shaped groove 48 about the circumference thereof. The V of V shaped groove 48 should form an approximately 60° angle.

Intermediate section 14 has three legs 50 (only two of which are shown) that are connected to base 12 such as by screw means 52. Each of legs 50 are connected to an upper circumferential section 54 that has an upper circumferential groove 56. Upper section 16 has a circumferential groove 58 that forms a chamber 60 with circumferential groove 56. O-rings 62 and 64 seal between member 54 and 16. Passage 66 in eac of legs 50 communicates from chamber 60 to port 68 for caging groove 48 and to passage 70 for spin up buckets 46.

Upper housing 16 has piston 72 mounted therein. O-ring 74 seals between piston 72 and housing 16 and O-ring 76 seals between stem 78 that is connected to piston 72 by securing means 80 and housing 16 that has bore 82 therein. Caging member 84 is integrally connected to stem 78 and maintains rotor 38 in caged position until time for spin up of rotor 38. Detent spring 86 is adapted to engage groove 88 of piston 72 and maintain caging member 84 in a retracted position. Inlet 90 is in communication with chamber 60 and passage 92 that communicates with piston 72.

In operation, low pressure fluid of about 80 psi is supplied through inlet port 30 to chamber 32 and air bearing space 36 to provide air bearing support for rotor 38. At the same time, high pressure fluid of about 1900 psi is supplied to inlet port 90, passage 92, chamber 60, and each of passages 66, 68, and 70. This high pressure fluid simultaneously retracts caging means 84 to an uncaged and latched position, maintains a caged condition of the gyro rotor by injected fluid acting on V-groove 48 and brings rotor 38 up to speed as it is being maintained in caged condition. After rotor 38 has been brought up to full speed, the high pressure fluid is gradually decreased to complete nozzle cut off. This will release the gyro rotor into the uncaged condition very evenly and smoothly to thus reduce any "uncaging kick" and improve uncaging repeatability. With rotor 38 in full operation, pickoffs 18 and 20 will function to produce signals in accordance with deviations of rotor 38 relative to fixed structures 12, 14, and 16. The signals produced by pickoffs 18, 20 can be used to drive controls as desired. The fluid used for the low pressure input to the air bearing as well as the high pressure fluid for maintaining the caged position of the rotor and that necessary for the spin up buckets can be a fluid such as air.

As can be seen, ball 28 and its support by stem 22, base 12, intermediate section 14, and top section 16 act as a stator for rotor 38. Rotor 38 is maintained in caged position after member 84 has been removed from rotor 38 by the fluid that is supplied through nozzles 68 and jetted onto opposite sides of V-groove 48 to maintain the rotor in a substantially maintained caged position relative to the stator portion of the gyro. Jet ports or nozzles 68 are substantially perpendicular to the circumferential V-groove. That is, nozzles 68 jet fluid straight into V-groove 48. Nozzles 68 will also work acceptably with V-groove 48 when slanted approximately 10° relative to the V-groove. Nozzle passages 70 have a conventional angular relationship with spin up buckets 46.

Figure 2:
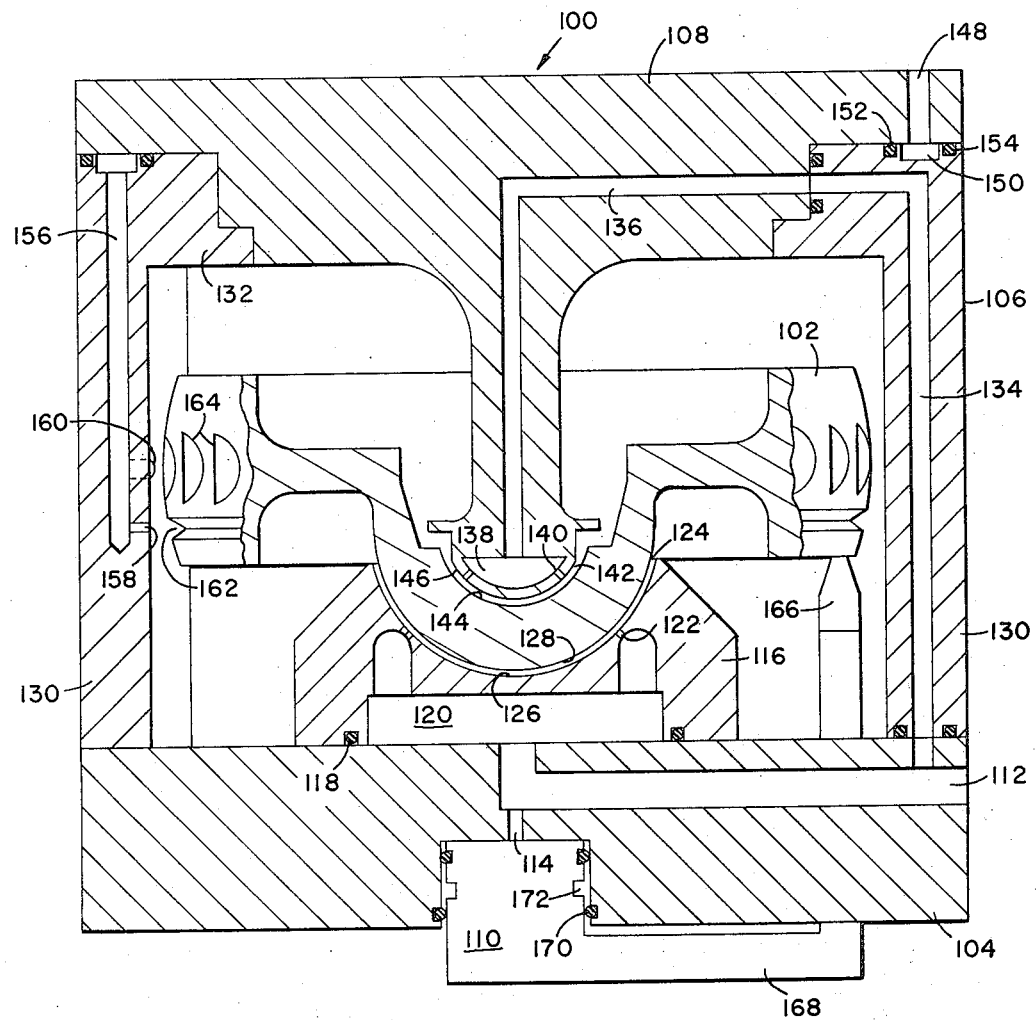
FIG. 2 is a sectional view of a gyro according to another embodiment of this invention.

Referring now to FIG. 2, another embodiment of the invention is shown in section so as to illustrate two of the legs of the intermediate section. FIG. 2 illustrates a gyro 100 that has a rotor 102 and a stator mechanism that is made up of base 104, intermediate section 106 and upper section 108. Base 104 has piston 110 mounted therein and a low pressure inlet passage 112 that communicates with the chamber for piston 110 by passage 114. Lower stator bearing support 116 is secured to base 104 in a conventional manner and has O-ring 118 to seal chamber 120 relative to base 104 and bearing support 116. Ports 122 communicate fluid from chamber 120 to air space 124 defined between concave surface 126 of member 116 and convex surface 128 of rotor 102.

Intermediate section 106 has three legs 130 that are secured to base 104 in a conventional manner and an upper circumferential portion 132 that supports legs 130 and is secured to upper member 108 in a conventional manner. Port 134 in one of the legs communicates fluid from inlet port 112 to passage 136 in upper member 108. Passage 136 is connected to chamber 138 and port 140 communicates fluid pressure from chamber 138 into air bearing space 142 defined by concave surface 144 of rotor 102 and convex surface 146 of upper member 108. High pressure inlet port 148 communicates high pressure fluid to circumferential groove 150 that is sealed by circumferential O-rings 152 and 154 and to passage 156 in each of legs 130. Each of legs 130 have a caging nozzle 158 and a spin up bucket nozzle 160. Nozzle 156 supplies fluid into groove 162 and directs equal forces to opposite sides of the V-groove when the rotor is in a caged position. Nozzle 160 provides the same high pressure fluid to spin up buckets 164 to bring rotor 102 up to speed.

Piston 110 is connected to caging members 166 (only one of three being shown) by arms 168 (only one of which is shown). Spring clip 170 engages groove 172 of piston 110 when piston 110 has been actuated to maintain the piston in a retracted position with members 166 removed from rotor 102.

In operation, low pressure fluid, such as air, is provided at inlet port 112 at the same time high pressure fluid, such as air, is supplied to inlet port 148. The low pressure fluid is supplied at a pressure of about 80 psi and the high pressure fluid is supplied at a pressure of about 1900 psi. The low pressure fluid entering port 112 communicates to piston 110, chamber 120 and chamber 138. The pressure acting on piston 110 retracts caging members 166 and caging member 166 is maintained in this retracted position by spring clip 170 being engaged in groove 172. Piston 110 normally maintains caging members 166 in caged position due to friction between piston 110 and the cylinder in which it is mounted. At the same time piston 110 is being actuated, fluid pressure is provided in air bearing spaces 124 and 142 to support rotor 102 on an air bearing. Also, fluid pressure entering inlet passage 148 is communicated to each of legs 130 through passage 156 to caging ports 158 and spin up bucket ports 160. The fluid pressure exhausting through caging ports 158 act on opposite sides of caging V shaped groove 162 to maintain rotor 102 in a rotor alignment and caged position during spin up of rotor 102. At the same time rotor 102 is being held in rotor alignment position by the fluid acting on caging groove 162, fluid pressure from spin up ports 160 acts on spin up buckets 164 to bring rotor 102 up to speed. After rotor 102 has been brought up to speed, high pressure fluid is gradually cut off and rotor 102 is released into an aligned and uncaged rotor position. Pickoffs (not shown) as desired can be used with the rotor to maintain a predetermined relationship between the rotor 102 and the stator or fixed mechanism that supports rotor 102. With the caging arrangement shown in FIG. 2 as well as the caging arrangement shown in FIG. 1, the rotor is released into an uncaged position in which the rotor is maintained in a rotor aligned position until the rotor has been brought up to full speed. The caging groove 162 should form an angle of 60° and caging ports 158 should open straight into caging groove 162. Spin up ports 160 sgould open at an angle to spin up buckets 164 in a conventional manner.

Gyros of the type disclosed herein can react faster due to the caging groove being used to maintain alignment of the rotor during spin up and the gyros are more reliable since repeatability can be obtained with gyros of this type. Further, gyros of this type can be completely fluid actuated and can have fluid control or electrical controls in the form of fluid pickoffs or electrical pickoffs.

We claim:

1. A gyro comprising a rotor having a generally spherical outer surface portion and an inner portion, stator means, and bearing means mounting said rotor at said inner portion relative to said stator means, said rotor having a continuous and uninterrupted V-shaped caging groove in said outer surface portion, said stator means having a plurality of caging ports for injecting fluid onto said caging groove to maintain said rotor in a predetermined caged position while said fluid is being injected onto said caging groove, said rotor having spin up buckets in said outer surface portion and in axial spaced apart relation to said caging groove to completely separate said caging groove axially from said spin up buckets to leave an uninterrupted surface between said caging groove and said spin up buckets, and said stator means has ports therein for directing fluid to said buckets to spin said rotor up to speed at the same time said rotor is being maintained in a caged position by fluid acting on said caging groove.

2. A gyro as set forth in claim 1, wherein said bearing means includes a ball shaped member with a plurality of passages opening into the surface of said ball and a ball shaped surface at said rotor inner portion to coact with said ball shaped member and define an air bearing space between the rotor ball shaped surface and said stator ball shaped surface.

3. A gyro as set forth in claim 2, wherein said gyro includes means for maintaining said rotor in a caged position relative to said stator means until said rotor is ready to be spun up by said spin up bucket means.

4. A gyro as set forth in claim 3, wherein said means for maintaining said rotor in caged position relative to said stator is actuated to a retracted position by piston means mounted in said stator means.

5. A gyro as set forth in claim 2, wherein said caging groove in cross-section forms an angle of about 60°, and said caging ports jet fluid straight into said caging groove.

6. A gyro as set forth in claim 5, wherein said stator means includes a base member, an intermediate portion that has three equally spaced legs that are integral to a circumferential member at one end and secured to said base at the other end and an upper section that is secured to said circumferential member.

7. A gyro as set forth in claim 1, wherein said bearing means includes convex and concave surfaces structurally mounted on said stator means between which convex and concave surfaces on said rotor inner portion are mounted to define air bearing spaces between the convex and concave surfaces.

* * * * *